United States Patent [19]

Marshall

[11] Patent Number: 5,101,393
[45] Date of Patent: Mar. 31, 1992

[54] OPTICAL POSITION ERROR DETECTION USING COMPLEMENTARY STEEP ANGLE REFLECTIONS/TRANSMISSIONS

[75] Inventor: Daniel R. Marshall, Boise, Id.

[73] Assignee: Hewlett-Packard Company, Palo Alto, Calif.

[21] Appl. No.: 558,006

[22] Filed: Jul. 25, 1990

[51] Int. Cl.$^5$ .............................................. G11B 7/00
[52] U.S. Cl. .............................. 369/44.37; 369/44.24; 369/44.14; 369/44.41
[58] Field of Search .............. 369/44.34, 44.24, 44.42, 369/44.28, 43, 110, 112, 44.11, 44.12, 44.13, 44.14, 44.15, 44.16, 44.17, 44.18, 44.19, 44.21, 44.22, 44.25, 44.26, 44.23, 44.27; 250/201.1, 202; 350/286, 287, 6.4

[56] References Cited

U.S. PATENT DOCUMENTS

| | | | |
|---|---|---|---|
| 3,547,526 | 10/1967 | Devereux | 350/286 |
| 4,422,168 | 12/1983 | Ito et al. | 369/45 |
| 4,423,495 | 12/1983 | Musha et al. | 369/45 |
| 4,425,636 | 1/1984 | Musha et al. | 369/44 |
| 4,453,239 | 6/1984 | Musha et al. | 369/45 |
| 4,455,085 | 6/1984 | Kato et al. | 356/123 |
| 4,504,938 | 3/1985 | Tajima | 369/44.37 |
| 4,505,584 | 3/1985 | Kato et al. | 356/123 |
| 4,509,830 | 4/1985 | Kato et al. | 350/394 |
| 4,525,825 | 6/1985 | Ito et al. | 369/45 |
| 4,638,471 | 1/1987 | van Rosmalen | 369/44.24 |
| 4,652,737 | 3/1987 | Kowalski et al. | 369/44.11 |
| 4,773,053 | 9/1988 | Gottfried | 369/45 |
| 4,779,250 | 10/1988 | Kogure et al. | 369/13 |
| 4,797,868 | 1/1989 | Ando | 369/44 |
| 4,862,442 | 8/1989 | Tadakoro et al. | 369/45 |
| 4,873,678 | 10/1989 | Nakamura et al. | 369/110 |

OTHER PUBLICATIONS

Freese, Robert P., "Optical Disks Become Erasable", IEEE Spectrum, Feb. 1988, pp. 41-45.

Mansuripur, M., et al., "Signal And Noise In Magneto-Optical Readout", J. Appl. Phys. 53(6) (Jun. 1982).

Lee, Wai-Hon, "Optical Technology For Compact Disk Pickups", Lasers and Optronics, pp. 85-87 (Sep. 1987).

Primary Examiner—Roy N. Envall, Jr.
Assistant Examiner—Thai Tran
Attorney, Agent, or Firm—E. F. Oberheim

[57] ABSTRACT

A method and apparatus for producing position error signals from a beam of light, called an input light beam, reflected from an optical surface of recording media, employs a detector prism which has a steep angle, reflection/transmission interface. A prism, such as a dove prism, separate from the detector prism, or other optical structure, integral with the detector prism, having one or more Brewster angle faces on which the input light beam is incident, is employed for inverting a portion of equal portions of the input light beam prior to incidence of the resulting beam on the reflection/transmission interface of the detector prism. Crossing of the marginal rays in the transmitted and reflected complementary light beams now does not invert the slope of the error signal. Now the error signal is not bilaterally sensitive in the respective complementary light beams. The signal instead is now generated by the difference in the total light energy in the respective transmitted and reflected complementary light beams.

22 Claims, 4 Drawing Sheets

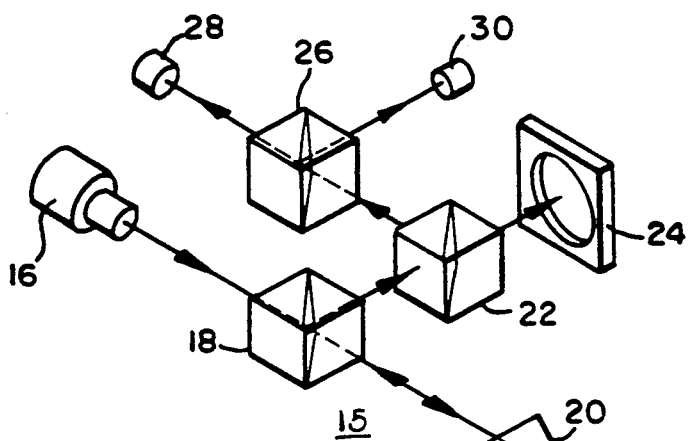
FIG. 1
PRIOR ART
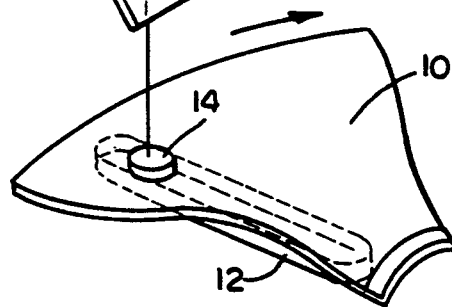
FIG. 2
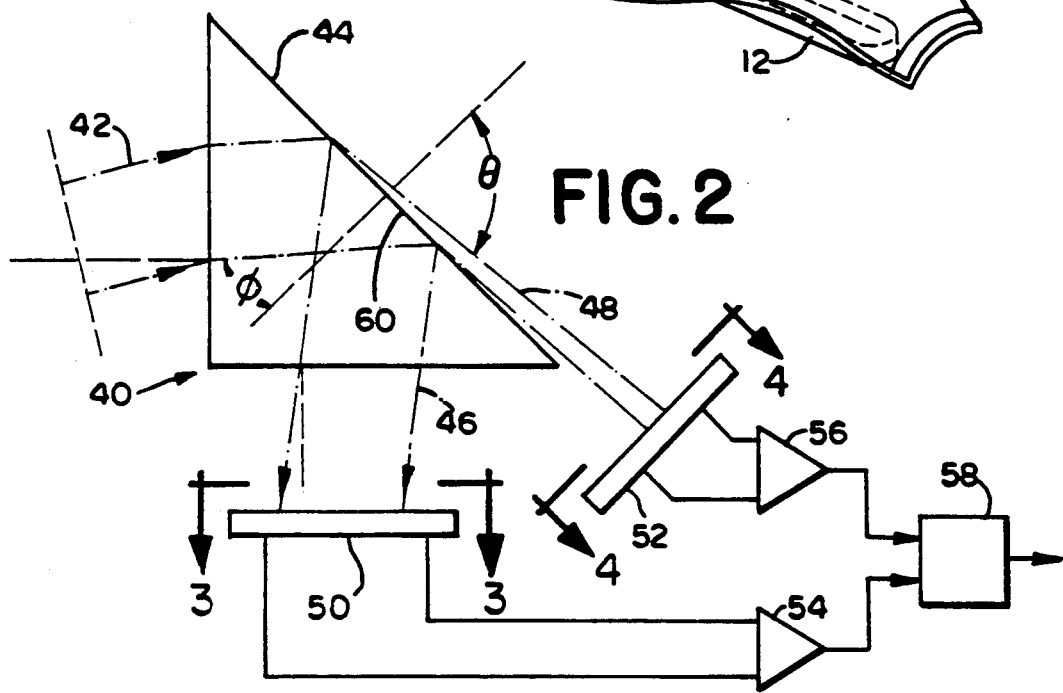

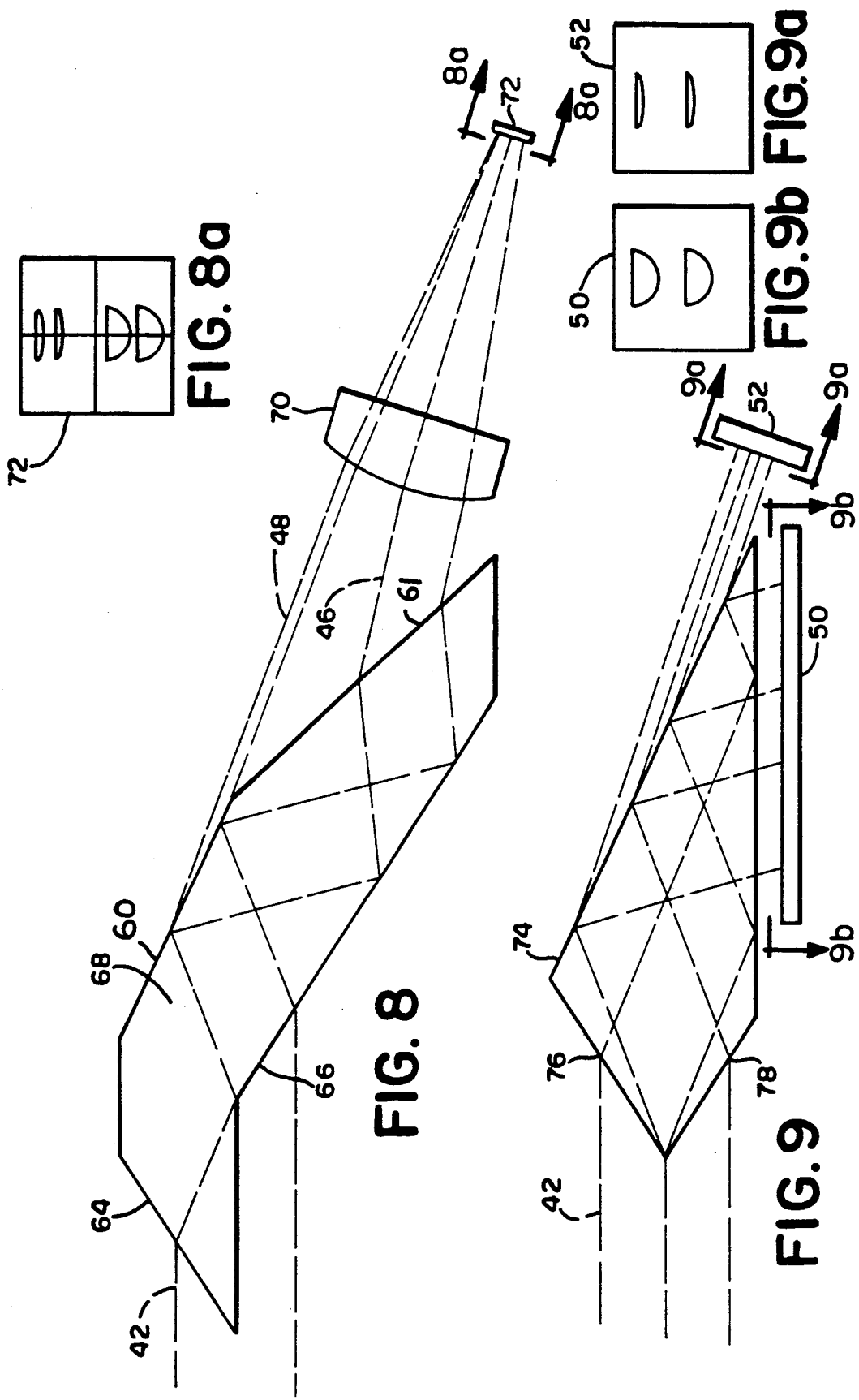

OPTICAL POSITION ERROR DETECTION USING COMPLEMENTARY STEEP ANGLE REFLECTIONS/TRANSMISSIONS

FIELD OF THE INVENTION

The present invention relates to optical information storage systems and more particularly to optical systems for developing position error signals to minimize error in transducing data recorded on optical media.

BACKGROUND OF THE INVENTION

A hybrid of the optical and magnetic information storage systems is the so called magneto-optical information storage system. Such systems can provide increased storage capacity over magnetic systems and allow data to be erased and rewritten, currently a problem in optical systems. It has been estimated that the theoretical upper limit of the storage capacity of magneto-optical systems can be at least as high as 300 megabytes per square inch of media. In practical terms this means that on a single 5.25 inch disk, capacities of approximately 400 to 800 megabytes can be achieved.

In magneto-optical storage, data are recorded and erased on a thin film of magnetic material having properties to be described herein. Similar to magnetic recording, magneto-optical recording stores information in a sequence of magnetic domains whose magnetic polarity is oriented normal to the media surface in either of two possible orientations. The orientations can be thought of as north-pole-up or north-pole-down. An erased disk has all of its magnetic poles pointing in the same direction. The important feature of magneto-optical media is that the magnetic force required to reverse the polarity of the magnetic domains, i.e. the coercive force, varies greatly with temperature. At room temperature, the coercive force necessary to reverse the polarity is so high that an ordinary magnet is too weak. At approximately 150° C., the coercive force required decreases substantially so that information can be recorded using magnetic fields of reasonable strength.

Optical techniques are used in magneto-optical systems to heat selected spots on the media using focused light as the media passes over an electro-magnet, or bias coil, similar to that shown in FIG. 1. In FIG. 1, a portion of a magneto-optical disk 10 is shown to be rotating between an electromagnet 12 and an objective lens 14, forming part of an optical head 15. During a writing operation, the light from a laser source 16 is passed through a polarizing beam splitter 18 and reflected from a mirror 20. The light reflected by the mirror 20 is focused by the lens 14 onto the surface of the disk 10. The heat associated with such focused laser light is sufficient to raise the temperature of the media at the focal point to approximately 150° C.

In this way, a "point" on the media can be heated, lowering the coercive force required to write information at that point. The heated spot within the medium will then take on the polarity of the magnetic flux generated by electromagnet 12. Once the laser beam is turned off, the just heated spot on the media cools, "freezing" the local magnetic orientation of the media due to the resulting increase in the coercive force at that point. To erase information so recorded, the process need only be reversed; that is the point on the media is heated by passing the laser beam through the objective lens 14 so that the magnetic orientation of the media at that point matches the direction of flux generated by the electromagnet.

Reading information so recorded on a magneto-optic disk is achieved by electro-optical means. Again referring to FIG. 1, a lower powered light beam from the laser source 16 is focused onto the media by the objective lens 14. Because of phenomena known as the Kerr magneto-optic effect and the Faraday effect, light reflected from the media (Kerr) or passing through the media (Faraday) will have a slightly different polarization state than that of the incident light focused onto the media. The change in polarization state will be either a clockwise or counterclockwise rotation depending on the magnetic orientation of the media at that point. For further graphical interpretation of the above described magneto-optic operation, reference is made to Freese, Robert P., "Optical disks become erasable", IEEE Spectrum, February, 1988, pages 41–45.

In FIG. 1, light focused onto the disk 10 by the objective lens 14 is reflected back onto the mirror 20 and into the polarizing beam splitter 18. Since the reflected light has a different polarization state than the light generated by the source 16, a portion is reflected by the mirror element contained in the polarizing beam splitter 18 onto the reflective element or interface in the beam splitter 22. Some of the beam is then directed onto a focus and tracking detector 24 for generation of position error signals, described in greater detail below. The remainder of the reflected beam is passed through a beam splitter 26 which is designed to split the light beam into two light beam components which are provided or applied to a pair of photodetectors 28 and 30. The photodetectors 28 and 30 generate electronic signals which characterize data or information stored on disk 10.

Such a differential data detection technique is described in Mansuripur, M., et al., "Signal And Noise In Magneto-Optical Readout", J. App. Phys. 53(6) (June 1982). Typically, data is detected by subtracting the electronic signals from each other in a difference amplifier. The amplifier output is thereafter filtered and processed according to any one of several known techniques. When reading information from or writing information onto a magneto-optical disk, or any optical disk, it is necessary to maintain the radial position of the light beam focused by the objective lens 14 on a particular disk track as the disk 10 rotates. Such an operation is known as track following. Track following requires the generation of a radial position (tracking) error signal. It will also be appreciated from the above that because relatively small magnetic domains will be recorded, read and erased, it is important to maintain a focused spot of light on the desired track. Maintaining the focus of the light beam requires the generation of a focus (axial) error signal. Each of these signals, the tracking (radial position) error signal and the focus (axial position) error signal, have generally heretofore been generated by segmented detectors whose outputs are differenced (subtracted) in various ways to produce these error signals.

Light reflected from a grooved magneto-optical disk which is directed onto the detector 24 will form a sheared interferogram. That is, when light is focused on a spot on a grooved media, such as that used in optical and magneto-optical disks, the reflected light contains a series of orders of diffraction, each having an axis deviated from the central axis. These diffraction orders normally overlap producing the sheared interferogram.

When sampled properly, such as with a segmented detector, the sheared interferogram can be used to generate the tracking error signal.

In one previous method of focus detection, the detector in effect senses the diameter of the reflected beam of light, i.e. an illuminated spot, including the sheared interferogram. In other words, focus can be determined by sensing the size of the spot formed by the intersection of the detector with the converging beam. This method is called "spot size detection".

In the generation of such tracking and focus error signals, detector elements in the shape of an "I" have been utilized. Additionally, quadrant type detectors have been proposed for use in determining position error (tracking and focus) signals. See for example, U.S. Pat. Nos. 4,773,053—Gottfried, 4,797,868—Ando and 4,779,250—Kogure, et al.; and Lee, Wai-Hon, "Optical Technology For Compact Disk Pickups", Lasers and Optronics, pp. 85-87 (September 1987).

The problem with such prior techniques for generating tracking error and focus error signals, is the relatively low sensitivity to the state of collimation of the light incident on the detector and high sensitivity to small motions of the reflected beam in relation to the detector. Also such prior systems are not capable of rejecting spatial variations in irradiance in the incoming beam resulting from dirty optical surfaces, lateral motion of the beam or as a result of diffraction of light by optical surfaces upstream from the detector, hereinafter collectively referred to as "pattern noise".

The U.S. Pat. No. 4,862,442, to Tadokoro et al, in reference to FIGS. 6 and 7 therein, discusses a ray tracing diagram based upon the optics organization of the principal parts of a prior art optical play back and recording system, referencing a Japanese Patent Application Laid-open No. 7246/1981.

In Tadokoro et al, light reflected from the surface of an information carrying medium is directed back through an objective lens adjacent the medium into a detector prism having a reflecting surface. Light reflected from that surface impinges upon a photo detector.

The reflecting surface of the detector prism is set so that when the objective lens is correctly focused with respect to the information carrying medium, the angle between the reflecting surface of the detector prism and the incident beam, defined by Tadokoro et al as a pencil of parallel rays, is equal to or slightly lens than the critical angle. If the information carrying medium deviates from the point of focus, the angle of incidence of the light beam incident on the reflecting surface of the detector prism varies around the critical angle. FIG. 7 is referenced to illustrate the extreme sensitivity of the reflecting surface of the detector prism to slight changes in the angle of incidence of the incident light beam near the critical angle.

The effect of departures from focus of the medium, in directions toward and away from the objective lens, upon light reflected and transmitted at the reflecting surface of the detector prism, is discussed at length by Tadokoro et al, noting, particularly, the resulting dead band in which no changes in reflected light beam intensity occur, if the critical angle is exceeded. Light transmitted through the reflecting surface of the detector prism is also discussed, noting the possibility of relocating the photodetector to intercept the transmitted light instead of the reflected light. This approach is negated, however, by Tadokoro et al, observing that in addition to having all of the problems of the arrangement using reflected light, there is the additional problem of an extremely small diameter beam which increases the difficulty of adjustment of the photodetector upon which the transmitted light beam impinges.

Tadokoro et al describe their solution to the problems discussed above in the use of a detector prism which has a multilayer reflecting surface which is stated to have a reflectivity which varies continually with respect to the angle of incidence. This detector prism, having variable reflectivity or transmissivity, is utilized in differing focus error detecting apparatuses, individually using reflected light, transmitted light and both transmitted and reflected light. Although Tadokoro et al describe a focus detection apparatus which uses a transmitted beam, their apparatus improves prior art only in the respect of eliminating "dead band" (discontinuity in the error curve).

Consequently, a need still exists for an apparatus, employing a detector prism to produce complementary light beams by reflections/transmission, for achieving high sensitivity in the production of focus and tracking signals, i.e. position error signals, for reducing sensitivity to small motions of the incident light beam relative to the detector and for rejecting spatial variations of beam irradiance (pattern noise).

SUMMARY OF THE INVENTION

The advantages of this invention are achieved in a method and apparatus for producing position error signals from a beam of light, herein called the input light beam, reflected from an optical surface of a media, in the provision of an optical means comprising a detector prism having a steep angle reflection/transmission interface, having, differing indices of refraction on opposite sides thereof, which receives the input light beam and produces first and second complementary light beams. Such an optical means may be a detector prism operable in ambient air, or with a transparent optical element having an index of refraction different from that of the detector prism, juxtaposed upon said reflection/transmission interface. Photo detector means, comprising one or two detectors, positioned to receive the first and second complementary light beams, produce first and second detector signals representative of light incident thereon. Signal processing means produce position error signals in response to the first and second detector signals.

In this application, the term "complementary" is used to describe a pair of light beams which vary in opposite senses. For example, in the case of the photo detectors referenced in the paragraph above, an optical system can be employed which creates two spots of light, one which grows in size on one photo detector while the other shrinks in size on the other photo detector. A position error signal circuit responsive to the amplified detector signals, differentially compares the detector signals and produces a position error signal. This is the essential mechanism of complementary signal development and processing to produce an error signal. When a complementary system is operated at its designed operating point it exhibits excellent immunity to the spatial variations in irradiance (pattern noise) described above.

Methods and apparatuses are described herein for developing a position error signal in which the complementary light beam generator, or optical means, comprises a detector prism having a reflection/transmission interface, wherein light within the prism which is incident at the interface at an angle less than the critical angle is both transmitted and reflected at the interface. The angle of incidence of the input light beam in the detector prism at the interface may be chosen, for example, such that the intensities of the light beam reflected at the interface and the light beam transmitted thereat are equal. In a detector prism having a refractive index of approximately n=1.51072, (BK7 at 780 nm wavelength) the angle at which light in the prism is incident at the interface is approximately 41.30°.

Another embodiment of a position error detector includes the detector prism together with an optical component for inverting one half of the input light beam incident on the detector prism.

A further embodiment includes the use of a prism having Brewster angle optical faces or windows through which the input light passes on its way to the detector prism. Additionally, particular shapes of prism structures comprising the detector prisms are shown in which the prism structures are integrally formed.

Although the invention is illustrated and described using a detector prism in which the steep angle, reflection/transmission interface is exposed to ambient air, the invention may be practiced employing other transparent materials, such as glass, having indices of refraction different from air and from the detector prism, juxtaposed on said reflection/transmission interface.

The term "detector prism" is a term of convenience for identifying that prism having the reflective/transmissive interface, among the prisms herein, employed to produce the complementary light beams.

BRIEF DESCRIPTION OF THE DRAWINGS

The present invention will be better understood, and its numerous objects and advantages will become apparent to those skilled in the art by reference to the following detailed description of the invention when taken in conjunction with the following drawings, in which:

FIG. 1 is a diagrammatic view of a prior art position error detection and differential data detection system;

FIG. 2 is a diagrammatic view of an optical position error detection system according to the present invention;

FIG. 8 is a diagrammatic view of a further alternative system for producing signals indicative of the state of collimation of a beam of light according to the present invention;

FIG. 8a is a plan view in the direction of the arrows 8a—8a of FIG. 8 of the photodetectors of FIG. 8;

FIG. 9 is a diagrammatic view of yet another alternative system for producing signals indicative of the state of collimation of a beam of light according to the present invention;

FIG. 9a is a plan view in the direction of the arrows 9a—9a of FIG. 9 or one of the photodetectors of FIG. 9;

FIG. 9b is a plan view in the direction of the arrows 9b—9b of FIG. 9 of the other of the photodetectors of FIG. 9;

DETAILED DESCRIPTION OF THE PREFERRED EMBODIMENT

Figure 5:
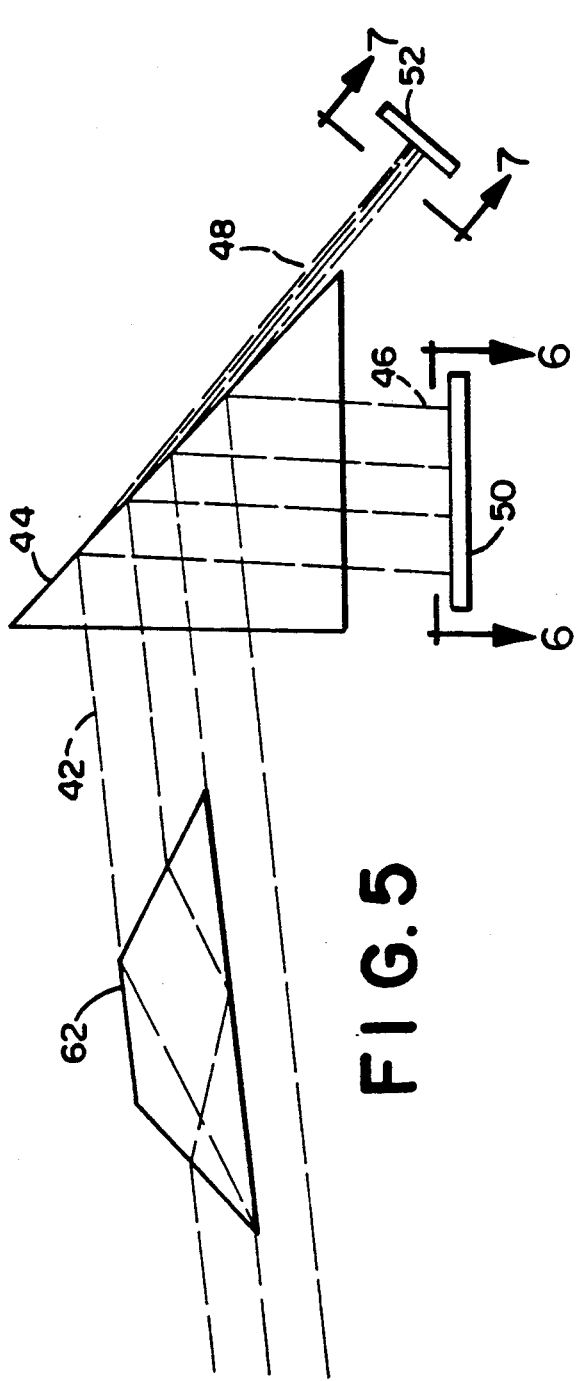
FIG. 5 is a diagrammatic view of an alternative system for producing signals indicative of the state of collimation of a beam of light according to the present invention.

A new and novel apparatus for complementary detection of the state of collimation of a beam of light for use in position error detection, is shown in FIG. 2 and is generally designated 40. In the generation of position error signals, in accordance with the present invention, two light beams formed by a detector prism from a single input light beam are utilized. These light beams are termed "complementary" light beams.

As used herein, the term "complementary light beams" refers to two light beams formed from a single light beam, the input light beam, wherein the two complementary light beams have a spatial distribution of irradiance such that with respect to a coordinate system in the input light beam, a brightening of one side in one of the complementary light beams corresponds to a darkening of that side in the other complementary light beam. Complementarity here is a consequence of the conservation of energy. In other words, the total or combined energy of the separate complementary light beams nominally equals the energy of the input light beam, while the energy in one complementary light beam may or may not be equal to the energy in the other complementary light beam.

As shown in FIG. 2, a beam of light 42, the input light beam, reflected from an optical surface of a media such as the media 10 of FIG. 1, is incident on an optical means, such as a detector prism 44. The detector prism 44 is positioned to receive the input light beam 42 reflected from the media and to produce a reflected light beam 46 and a transmitted light beam 48 at an interface 60. The light beams 46 and 48 are complementary. A first photo detector 50 is positioned so that the reflected or first complementary light beam 46 is incident thereon. The photo detector 50 produces an electrical signal representative of light incident thereon. A second photo detector 52 is positioned so that the transmitted or second complementary light beam 48 is incident thereon. The photo detector 52 also produces an electrical signal representative of light incident thereon. The electrical detector signals produced by the photo detectors 50 and 52 are coupled as input to amplifiers 54 and 56, respectively. The electrical outputs of the amplifiers 54 and 56 are connected to a signal processor 58. The signal processor 58 differentially processes the amplified electrical signals from the photo detectors 50 and 52 and produces focus or position error signals. Tracking error signals may also be produced by the signal processor 58 from either or both of the detector signals from the photo detector arrays 50 and 52, as is well known.

As shown in FIG. 2, the detector prism 44 is a transparent prism, having a reflection/transmission prism face or interface 60. The interface 60 is oriented with respect to the input light beam 42, such that the input beam of light in the prism is incident at the interface 60 at an angle $\phi$, somewhat less than the critical angle. At that angle $\phi$, a portion of the light at the interface 60 is reflected (first complementary light beam 46) and a portion is transmitted thereat (second complementary light beam 48). In the ambient air the second complementary light beam 48 is transmitted at the prism interface 60 at an angle $\theta$, measured from a line which is perpendicular to the face 60, which, in the presently preferred embodiment, is a steep angle, e.g., approximately 85.6° when the refractive index, n, of prism 44 is approximately, n=1.51072. In that same example, $\phi$ is approximately equal to 41.3°. It should be noted that in such a situation, the intensity of the light in the first complementary light beam 46 is approximately equal to the intensity of the light in the second complementary light beam 48. For transparent materials other than air, juxtaposed at the interface 60, and having respective indices of refraction different from that of air, the angles $\theta$ and $\phi$ are different.

Figure 4:
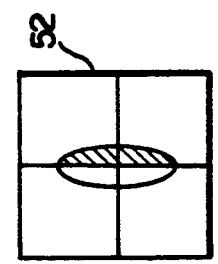
FIG. 4 is a plan view in the direction of the arrows 4—4 of FIG. 2 of the other of the photodetectors of FIG. 2.
Figure 3:
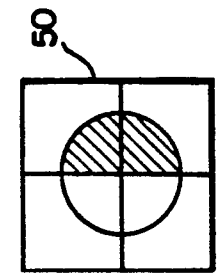
FIG. 3 is a plan view in the direction of the arrows 3—3 of FIG. 2 of one of the photodetectors of FIG. 2.

Focus error signals are generated by a lateral imbalance of the light incident on the two photo detectors 50 and 52, resulting from the angular dependence of the reflection/transmission coefficients at the dielectric interface 60, i.e. dependence of the Fresnel reflection coefficients. Because light energy is nominally conserved at the interface 60, the portion of the light beam which is darker on the one detector is brighter on the other detector. It should be noted that because one image is reversed by reflection, the darker portion of the light beam at both detectors, for example, will be on the right, as shown in FIGS. 3 and 4. It is evident that this image reversal also applies to pattern noise, thus making the scheme complementary, rather than redundant.

As shown in FIG. 3, the photo detector 50 is a quadrant detector as is the photo detector 52 shown in FIG. 4 so that tracking signals may also be generated. As shown in FIG. 4, the second complementary light beam 48, which is the transmitted light beam, has been anamorphically compressed.

In operation, the detector signal produced by the photo detector 52 is subtracted from the detector signal generated by the photo detector 50, either at the same amplification, or with some preset amplification ratio in the case where the reflected portion is chosen to be unequal to the transmitted portion. A net collimation error signal results. This collimation error signal has several advantageous properties. The collimation error signal can be made more or less strongly dependent on departures from collimation by varying the ratio of reflected/transmitted light, so that the resulting error signal is sensitivity dependent on the state of collimation of the incident input light beam 42. This sensitivity may be "tuned" by adjusting the incidence angle $\phi$ of the input light beam at the interface 60. Additionally, the collimation error signal has significantly reduced sensitivity to small motions of the input light beam 42 relative to the photo detectors 50 and 52 because of its complementary nature. As used herein "small motions" means less than approximately ¼ of the diameter of the light beam. Still further, the error signal exhibits excellent rejection of spatial variations in irradiance in the input light beam 42, (pattern noise) which spatial variations may be due to dirty optical surfaces or diffraction of light by optical surfaces prior to impingement upon the photo detectors 50 and 52.

Since the detection method shown in FIG. 2 depends upon the spatial distribution of light in the plane of detection, relative movement of the illuminated area on the detector, as caused by refraction or thermal expansion, for example, in some circumstances may interfere with the accurate development of a position error signal.

One way for improving the performance of a system using the reflection/transmission, complementary light beam principle, involves reversing the contribution of one half of the input light beam 42 in such a way that the detector signals do not depend upon the spatial distributions of light within the respective complementary light beams propagating from the detector prism 44 to photo detectors 50 and 52. Instead, the detector output signals depend only upon the total amount of light contained in those complementary light beams incident on the photo detectors 50 and 52.

Figure 7:
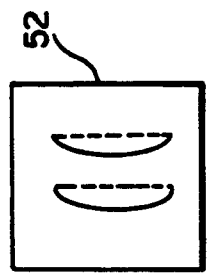
FIG. 7 is a plan view in the direction of the arrows 7—7 of FIG. 5 of the photodetectors of FIG. 5.
Figure 6:
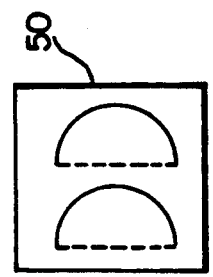
FIG. 6 is a plan view in the direction of the arrows 6—6 of FIG. 5 of one of the photodetectors of FIG. 5.

Consider the example shown in FIG. 5, where a dove prism 62 is positioned in the input light beam 42 ahead of the detector prism 44. The dove prism 62 is oriented so that half of the input light beam 42 is incident thereon. The dove prism 62 serves to invert that portion of the input light beam incident thereon prior to its incidence on the detector prism 44. The resulting light beam comprises the inverted and the uninverted portions of the input light beam. As shown in FIGS. 6 and 7, both "D"-shaped images present in the complementary light beams 46 and 48, display identical angular behavior and both brighten or darken together in response to convergence or divergence of the input light beam 42. The focus or position error signal is still developed by differentially comparing the output signals of the amplifiers 54 and 56 in the signal processor 58. The position error signal is now generated by an imbalance between the amount of light arriving at the photo detector 50 and the amount of light arriving at the photo detector 52. It should be noted that two single element detectors can be sufficient to generate complementary focus error signals, as long as the photo detectors 50 and 52 are large enough to collect all of the light from or passing through the detector prism 44. With the photo detectors 50 and 52, shown in FIG. 5, refraction of the output light beams 46 and 48, including crossing of marginal and central rays after the steep angle reflecting/transmitting interface 60, has no effect on the error signal.

If the input light beam 42 is split by a pair of Brewster angle input windows, a better, more asymmetrical resulting light beam geometry results. As shown in FIG. 8, the input light beam 42 is incident on a pair of Brewster angle windows 64 and 66 forming an integral part of a detector prism 68. The detector prism 68 comprises a face or interface 60 like that of the prism 44 of FIG. 2. Light from the Brewster angle windows in the detector prism 68 is incident upon the prism face 60 at less than the critical angle, forming the reflected complementary light beam 46 and the transmitted complementary light beam 48. The reflected complementary light beam 46 exits the detector prism 68 at the prism face 61. The prism faces 66 and 61 are at angles with respect to the reflected complementary light beam 46 and the detector prism interface 60 that the complementary light beams 48 and 46 exiting the prism 68 at the reflective/transmissive interface 60 and the face 61 are closely spaced and are directed in the same general direction. A single converging lens 70 is positioned to intercept and to converge the light beams 46 and 48 onto a photo detector 72. If the photo detector 72 is a quadrant photo detector, a fully complementary focus error signal and a conventional so-called "push-pull" tracking error signal can be generated, as before.

As shown in FIG. 9, a geometrically simplified detector prism 74 is provided wherein the input light beam 42 is incident upon a pair of prism faces or Brewster windows 76 and 78. In this embodiment, the Brewster prism faces or windows 76 and 78 are positioned adjacent one another and oriented so that substantially one half of the input light beam 42 passes through the Brewster prism face or window 76 and substantially all of the remaining half of the input light beam 42 passes through the Brewster prism face or window 78. As shown, the detector prism 74 is integrally formed. The photo detectors 50 and 52 receive the reflected and transmitted light beams 46 and 48, respectively.

Figure 10:
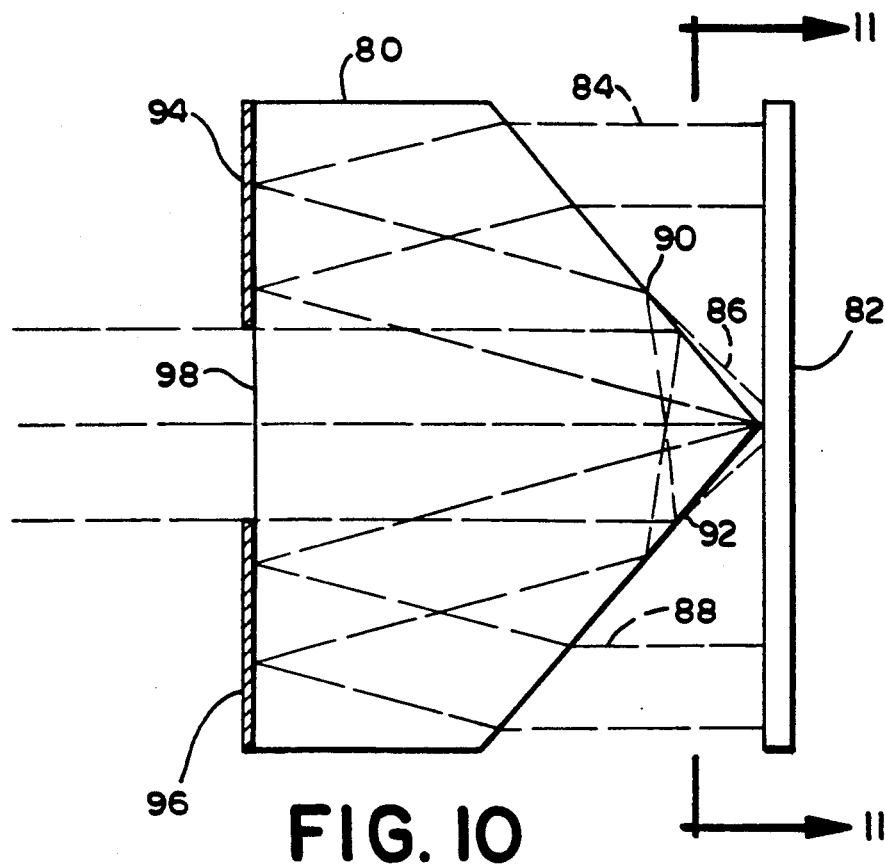
FIG. 10 is a diagrammatic view of still another alternative system for producing signals indicative of the state of collimation of a beam of light according to the present invention.
Figure 11:
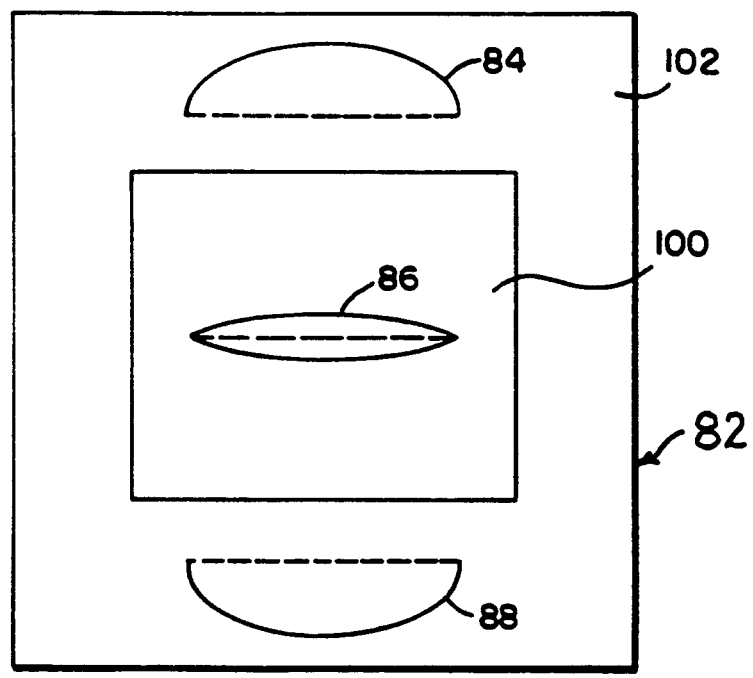
FIG. 11 is a plan view in the direction of the arrows 11—11 of FIG. 10 of the photodetectors of FIG. 10.

In a further embodiment of this invention, a detector prism 80 and a single photo detector 82 are utilized in the development of position error signals, as shown in FIGS. 10 and 11. In this embodiment, the detector prism 80 produces light beams 84, 86 and 88. Although the light beams 84, 86 and 88 are all eventually transmitted, it will be noted that at the point where the input light beam 86 is transmitted, the light beams 84 and 88 are reflected. The reflected light beams and the transmitted light beams are complementary. The light beam 86 is formed by a pair of complementary steep angle reflection/transmission interfaces or windows 90 and 92, which are positioned adjacent one another. Here again, the incident light is incident at the reflection/transmission interfaces 90 and 92 at less than the critical angle. It will also be noted that a portion of an input surface of prism 80 is reflectively coated, as depicted by opaque films 94 and 96 which define a central window 98 through which the input light beam passes. This window may or may not be substantially larger than the input beam. As shown in FIG. 11, the photo detector 82 is segmented and comprises an inner photo detector area 100 and an outer photo detector area 102. This detector 82 also can be split to provide "push-pull" tracking error signals, as before.

When practicing the present invention, the optical system exhibits reduced sensitivity to physical features or defects in tracks on the recorded surface of the media where a focused spot of light interacts with the optical media (pattern noise). The focus or position error detection system exhibits reduced sensitivity to tilt of the recording surface and resulting beam displacement. The position error detection system also exhibits reduced sensitivity to the motion of the input light beam 42 reflected from the recording media caused, for example, by motion of the optical head FIG. 1 across the surface of the recording media 10. This system also exhibits reduced sensitivity to motion of the combined detector assembly, caused by thermal or mechanical "creep". This system is also insensitive to relatively large changes in the distance from an imaging objective to the collimation error sensing assembly, i.e., from objective lens 14, shown in FIG. 1, to the optical assembly 40, assuming that the assembly 40 is substituted for the detector 24 of FIG. 1. Additionally, the optical assembly 40 has sensitivity to the state of collimation of the incoming beam which can be "tuned" by adjusting the ratio of transmitted/reflected light. Such a "tunability" can help to improve system performance through rejection of numerous spurious influences which can mimic proper error signals. The optical assembly 40 also exhibits reduced sensitivity to systematic changes in the distribution or location of the incoming light beam 42 due to accumulations of dirt on optical surfaces or to small motions of components and reduced sensitivity to rotation of the incoming collimated beams 42.

While the invention has been described and illustrated with reference to specific embodiments, those skilled in the art will recognize that further modifications and variations may be made without departing from the principles of the invention.

What is claimed is:

1. Apparatus for producing a position error signal in response to an input light beam which is reflected from an optical surface of recording media, comprising:
    optical means disposed in the path of said input light beam for inverting part of said input light beam providing a resulting light beam having an inverted part and an uninverted part;
    detector prism means for receiving at least part of said resulting light beam;
    said detector prism means having a complementary, steep angle, reflection/transmission interface, having differing indices of refraction on opposite sides thereof, on which said resulting light beam is incident at an angle less than the critical angle, for producing a first complementary light beam from said resulting light beam reflected internally of said detector prism at said reflection/transmission interface and a second complementary light beam from said resulting light beam which is transmitted across said reflection/transmission interface;
    photo detector means comprising a first photo detector part disposed in the path of said first complementary light beam for producing a first detector signal representative of light incident upon said first photo detector part, and a second photodetector part disposed in the path of said second complementary light beam for producing a second detector signal representative of light incident upon said second photo detector part; and
    signal processing means responsive to said first detector signal and to said second detector signal for producing said position error signal.

2. The apparatus of claim 1, wherein said signal processing means comprises means for subtracting one detector signal from the other detector signal to produce said position error signal.

3. The apparatus of claim 1, wherein said detector prism means has refractive indices on opposite sides of said interface and an interface angle in reference to the angle of incidence thereat of said resulting light beam, chosen such that said first complimentary light beam and said second complimentary light beam contain nominally equal amounts of power.

4. The apparatus of claim 1, wherein said detector prism means has refractive indices on opposite sides of said interface and an interface angle in reference to the angle of incidence thereat of said resulting light beam, chosen such that said first complimentary light beam and said second complimentary light beam contain unequal amounts of power.

5. The apparatus of claim 3, in which:
    said first photo detector part and said second photo detector part comprise separate detectors.

6. The apparatus of claim 1, in which said optical means comprises a second prism.

7. The apparatus of claim 6, wherein said second prism is a dove prism.

8. The apparatus of claim 6, wherein said second prism and said detector prism means comprise an integral optical structure.

9. The apparatus of claim 8, wherein said integral optical structure comprises first and second Brewster angle input optical faces on which said input light beam is incident.

10. The apparatus of claim 9, in which:
said first and second Brewster angle input optical faces are positioned adjacent one another and oriented so that substantially one half of the input light beam passes through the first Brewster angle input optical face and substantially the remaining half of the input light beam passes through the second Brewster angle input optical face.

11. Apparatus for producing a position error signal in response to an input light beam which is reflected from an optical surface of recording media, comprising:
detector prism means having a steep angle reflection/transmission interface, positioned to receive at least part of said input light beam, for producing first and second complementary light beams, said detector prism means having an output face adjacent said steep angle reflection/transmission interface, said detector prism means being positioned in the path of said input light beam to receive said input light beam at said reflection/transmission interface and to produce a reflected first complementary light beam and a transmitted second complimentary light beam at said reflection/transmission interface, the reflected first complementary light beam passing from said detector prism means at said output face in substantially the same direction as the transmitted second complementary light beam at said reflection/transmission interface;
a focusing lens in the path of said first complementary light beam and said second complementary light beams
photo detector means positioned in the path of light from said focusing lens so that the first complimentary light beam and the second complimentary light beam are incident thereon, for producing detector signals respectively representative of light from said first complimentary light beam and said second complementary light beam incident on said photo detector; and
means for processing said detector signals to produce said position error signal.

12. Apparatus for producing a position error signal in response to an input light beam which is reflected from an optical surface of recording media, comprising:
detector prism means for receiving at least part of said input light beam and having first and second adjacent, steep angle reflection/transmission interfaces, said detector prism being positioned in the path of said input light beam to receive said input light beam at both reflection/transmission interfaces and to produce first complementary light beams which comprise light reflected at said reflection/transmission interfaces and respective second complementary light beams transmitted at said reflection/transmission interfaces;
photo detector means, positioned so that the first complementary light beams and the second complementary light beams are incident upon different parts thereon, for producing detector signals representative of light incident on said photo detector means; and
means responsive to said detector signals for producing said position error signal.

13. Apparatus for producing a position error signal in response to an input light beam which is reflected from an optical surface of recording media, comprising:
detector prism means for receiving at least part of said input light beam and having first and second adjacent, steep angle reflection/transmission interfaces, said detector prism being positioned in the path of said input beam to receive said input light beam at both reflection/transmission interfaces and to produce first complementary light beams which comprise light reflected at said reflection/transmission interfaces and respective second complementary light beams transmitted at said reflection/transmission interfaces;
said detector prism means further comprises an input face having a reflective coating thereon providing an opening through which said input light beam is incident substantially equally on said reflection/transmission interfaces, said reflection/transmission interfaces being disposed at angles so that said first complimentary light beams and said second complimentary light beams are directed in substantially the same general direction;
photo detector means, positioned so that the first complementary light beams and the second complementary light beams are incident upon different parts thereon, for producing detector signals representative of light incident on said photo detector means; and
means responsive to said detector signals for producing said position error signal.

14. The apparatus of claim 12, in which:
said photo detector means is a segmented detector comprising an inner photo detector and an outer photo detector, wherein said second complementary light beams are incident on said inner detector and wherein said first complementary light beams are incident on said outer detector.

15. In a system employing a detector prism having a steep angle, reflection/transmission interface, a method for generating a position error signal from an input light beam reflected from an optical surface comprising:
inverting part of said input light beam and producing a resulting light beam from the inverted and uninverted parts of said input light beam;
applying said resulting light beam to said steep angle reflection/transmission interface of said detector prism at an angle less than the critical angle for producing a reflected complementary light beam reflected from said interface and a transmitted complementary light beam transmitted across said interface;
producing a first electrical signal in response to said reflected complementary light beam;
producing a second electrical signal in response to said second transmitted complementary light beam; and
producing a position error signal in response to said first electrical signal and said second electrical signal.

16. The method of claim 15, wherein the step of producing said position error signal comprises the step of subtracting one electrical signal from the other electrical signal.

17. The method of claim 15, wherein the step of applying said resulting light beam to said interface applies said input light beam at an angle so that the intensities of light in said reflected complementary light beam and said transmitted complementary light beam are substantially equal.

18. The method of claim 15, in which the step of inverting part of said input light beam comprises inverting approximately half of said input light beam of light prior to incidence on said reflection/transmission interface.

19. The method of claim 18, wherein said step of inverting approximately half of said input light beam comprises positioning a dove prism in said input light beam ahead of said reflection/transmission interface so that approximately half of said input light beam is incident thereon.

20. The method of claim 18, wherein the step of inverting approximately half of said input light beam comprises the steps of providing a prism through which said input light beam is made to pass, said prism comprising input windows and internal reflecting surfaces which reverse and direct said light passing therethrough.

21. The method of claim 20, wherein said windows are oriented at Brewster's angle.

22. The method of claim 15, wherein the step of applying said resulting light beam to said interface comprises applying said resulting light beam at an angle so that the intensities of light in said reflected complementary light beam and said transmitted complementary light beam are unequal.

* * * * *